United States Patent [19]

Guimbal

[11] Patent Number: 5,788,182
[45] Date of Patent: Aug. 4, 1998

[54] BIDIRECTIONAL ANTIVIBRATION SUSPENSION DEVICE FOR HELICOPTER ROTOR

[75] Inventor: Bruno Robert Guimbal, Les Milles, France

[73] Assignee: Eurocopter France, Marignane Cedex, France

[21] Appl. No.: 575,365

[22] Filed: Dec. 20, 1995

[30] Foreign Application Priority Data

Dec. 23, 1994 [FR] France .................. 94 15592

[51] Int. Cl.⁶ .................................................. B64C 27/04
[52] U.S. Cl. .................................. 244/17.27; 244/17.11; 244/17.25
[58] Field of Search ................... 244/17.27, 17.11, 244/17.25; 248/554, 555, 556, 557, 558, 559; 188/378, 379, 380

[56] References Cited

U.S. PATENT DOCUMENTS

| | | |
|---|---|---|
| 3,698,663 | 10/1972 | Balke . |
| 3,858,831 | 1/1975 | Halwes ............................ 244/17.27 |
| 3,945,628 | 3/1976 | Halwes . |
| 4,014,484 | 3/1977 | Mouille ........................... 244/17.27 |
| 4,405,101 | 9/1983 | Carlson et al. ................. 244/17.27 |
| 4,673,170 | 6/1987 | Dykema .......................... 188/380 |
| 4,744,547 | 5/1988 | Hartell ............................ 188/379 |
| 5,190,244 | 3/1993 | Yana ............................... 244/17.27 |
| 5,211,369 | 5/1993 | Hoerner .......................... 248/588 |

FOREIGN PATENT DOCUMENTS 1 380 710 12/1971 United Kingdom .

Primary Examiner—Andres Kashnikow
Assistant Examiner—Tien Dinh
Attorney, Agent, or Firm—Larson & Taylor

[57] ABSTRACT

The bidirectional suspension comprises, in order to connect the transmission gearbox to the fuselage, two parallel connecting rods which are articulated to lateral supports on opposite sides of the base of this gearbox and on the same side of the latter as far as their articulations to two transverse levers, each articulated to the fuselage about an axis perpendicular to the connecting rods and substantially parallel to the axis of the rotor. Each of the two levers lie substantially in the extension of the other and are connected to each other via their adjacent ends. Means providing elastic linkages in the direction of the connecting rods and in the direction perpendicular to the latter connect the fuselage to the gearbox and may consist of a single elastic pad.

14 Claims, 3 Drawing Sheets

BIDIRECTIONAL ANTIVIBRATION SUSPENSION DEVICE FOR HELICOPTER ROTOR

The invention relates to a device for the bidirectional antivibration suspension of a helicopter rotor, in particular the main or lifting rotor, on the fuselage of the helicopter, that is to say a suspension device intended to filter vibrations between the rotor and the fuselage, in particular in two directions which are perpendicular to each other and to the axis of rotation of the rotor.

In general, on helicopters, the or each main rotor is rotationally integral with a rotor mast or shaft supported and driven in rotation about its axis, which constitutes the axis of rotation of the rotor, by a so-called main transmission gearbox which is coaxial with the rotor mast about the axis of rotation and connected via at least one transmission shaft to a propulsion unit supported by the structure of the fuselage of the helicopter, in general on an upper part of the fuselage, called the transmission support platform, on which platform is also mounted the assembly consisting of the main transmission gearbox, the mast and the rotor.

Essentially because of the alternating forces which are exerted on the components of the rotor as it rotates, the aforementioned assembly must be mounted on the fuselage by means of a suspension device filtering the vibrations transmitted from the rotor to the fuselage, and in particular the longitudinal (with respect to the helicopter) and transverse or lateral excitations, which are the most troublesome.

Among the many known antivibration suspension devices for a helicopter rotor, the so-called "focal point" devices have formed the subject of various proposals and embodiments.

One particular focal-point bidirectional suspension device is described in U.S. Pat. No. 3,698,663, and comprises:

a set of at least three straight rigid suspension bars which are distributed around the transmission gearbox in question and are arranged obliquely so as to converge toward the axis of rotation and toward the top or bottom of the transmission gearbox, substantially at a point called the "focal point", each bar being connected via one end to the transmission gearbox and articulated via its other end to a structural support on the fuselage; and a device for linking the base of the transmission gearbox to the fuselage, allowing transfer to the fuselage of the reaction torque in reaction to the driving torque of the rotor via the transmission gearbox as well as displacements of the base of the transmission gearbox with respect to the fuselage with compliance in two directions perpendicular to each other and to the axis of rotation, which are the longitudinal direction and the transverse direction of the helicopter, in order to filter vibrations between the rotor and the fuselage in these two directions.

In such a suspension device, the aforementioned assembly, comprising the main transmission gearbox, the mast and the rotor, is thus attached to the structure of the fuselage by the set of oblique bars converging on the focal point, around which point this suspended assembly can oscillate.

The linkage device connecting the base or the bottom of the transmission gearbox to the structure of the fuselage comprises torque transfer means and elastic linkage means which include at least one elastic return element in each of said perpendicular directions.

The torque transfer means comprise two identical connecting rods, these being substantially parallel and extending substantially in a same plane perpendicular to the axis of rotation, one end of each connecting rod being articulated respectively to one of two lateral supports which are fixed to opposite sides of the transmission gearbox, the connecting rods extending on the same side of a plane substantially parallel to the axis of rotation and passing through the articulations of the connecting rods on said lateral supports, whereas the other end of the connecting rods is articulated to at least one member which is transverse to the direction of the connecting rods and which is itself articulated to the structure of the fuselage so as to rotate about an axis perpendicular to the connecting rods while being elastically returned toward an initial position.

According to U.S. Pat. No. 3,698,663, the device comprises a single transverse member, which is a torque tube having an axis substantially perpendicular to the axis of rotation and to the connecting rods and being articulated about its axis to at least two structural supports on the fuselage, the connecting rods being articulated via their other end to the torque tube so as to stress the latter substantially with the same torque moment but in opposite directions, the articulations of the connecting rods to the torque tube each being located in the vicinity of respectively one of the two articulations of the torque tube to the structure of the fuselage and between these two articulations.

This device has the advantage of ensuring bidirectional suspension providing a high torque stiffness by means of the connecting rods, one of which is stressed in tension and the other in compression, and which constitute, with the torque tube to which the connecting rods are articulated, a main kinematic chain, which is entirely mechanical, ensuring torque blockage, without running the risk of damage, especially by the hydraulic oils, the torque stoppage being independent of the longitudinal and transverse displacements of the base of the transmission gearbox, which are damped by a secondary kinematic chain comprising the elastic linkage means.

In U.S. Pat. No. 3,698,663, these elastic linkage means comprise, in order to provide the elastic linkage perpendicular to the connecting rods, two other connecting rods each articulated to the base of the transmission gearbox via one end and the other end of which is connected to a structural support on the fuselage via an element made of elastomer, providing the lateral return, whereas the longitudinal return, or the elastic linkage substantially parallel to the connecting rods, is provided by two elements made of elastomer, each of which is mounted between a structural support on the fuselage and one end of respectively one of yet two other connecting rods each articulated via its other end to the free end of respectively one of two lever arms, projecting radially from the torque tube, and each in the diametral extension and on the opposite side of respectively one of two other radial lever arms rotationally integral with the torque tube, and on the free end of each of which is articulated respectively one of the two connecting rods connected to the transmission gearbox.

With this architecture, it is understood that a torque tube of modest dimensions is sufficient to ensure high torque rigidity if the connecting rods connected to the transmission gearbox stress the torque tube with very short lever arms.

However, by construction, it is not possible for these lever arms to have as short a length as desirable and these lever arms are extended by those of the elastic linkage means in the direction of the connecting rods, so that the overall size of the device, parallel to the axis of the rotor remains large. This means that the connecting rods of the main kinematic chain cannot be articulated to the transmission gearbox at its base and that the lever arms, connecting rods and elastomer elements of the elastic linkage means in the direction of the connecting rods must be housed beneath the transmission support platform, which complicates the mounting and maintenance accessibility.

Furthermore, it is difficult and expensive to articulate the torque tube to the fuselage and the main connecting rods to the torque tube in such a way that the forces in the connecting rods are perfectly opposed, and the torque tube is stressed by alternating and opposed stresses which are highly detrimental to its lifetime. Another drawback of this known device is its weight and its overall size because it includes, in addition to the two main connecting rods, two other pairs of connecting rods of the elastic linkage means.

The object of the invention is to propose an improvement to the bidirectional antivibration suspension device of the type known from U.S. Pat. No. 3,698,663 and presented above, which remedies the aforementioned drawbacks of this known device by being completely disengaged from the underside of the main transmission gearbox and the transmission support platform, and by presenting a high enough torque stiffness, but which stiffness is provided by a main kinematic chain of lower height above the transmission support platform of the fuselage.

Another object of the invention is to propose such a suspension device which readily allows longitudinal and transverse suspension stiffnesses to be adopted which are very different from each other.

Yet another object of the invention is to propose such a device which requires only a minimum of points of attachment to the structure of the fuselage, and being easy to maintain by virtue of simplified interfaces, on the one hand, with the main transmission gearbox and, on the other hand, with the fuselage, while at the same time being very reliable.

Finally, another object of the invention is to propose such a device which includes simple, inexpensive and easily serviceable elastic linkage means.

For this purpose, the invention proposes a bidirectional antivibration suspension device, of the type presented above, which is characterized in that it comprises two transverse members which are levers, each lying substantially in the extension of the other, perpendicular to the connecting rods, and each being articulated so as to pivot respectively on one of two structural supports on the fuselage about an axis substantially parallel to the axis of the rotor, each of the connecting rods being articulated via its other end respectively to one of the two levers, in the vicinity of the articulation of the corresponding lever to the corresponding structural support, the two levers being moreover connected to each other, substantially in the radial plane passing through the axis of the rotor and parallel to the connecting rods, via their adjacent ends stressed by at least one elastic return element providing an elastic linkage in at least the direction of the connecting rods.

Conventionally, and in addition to the aforementioned elastic return element, the elastic linkage means of the device of the invention may possibly comprise two pairs of diametrically opposed springs, one pair providing an elastic linkage in the direction of the connecting rods and the other pair in the direction perpendicular to the connecting rods, each spring being metallic or made of rubber and mounted between a structural support on the fuselage and a lateral support on the base of the transmission gearbox, which, for the springs providing the elastic linkage perpendicular to the connecting rods, may be one of the lateral supports to which the connecting rods are articulated. However, according to the invention, it is sufficient for the elastic linkage means to comprise at least two springs, one of which provides an elastic linkage in the direction of the connecting rods and the other of which provides an elastic linkage in the direction perpendicular to that of the connecting rods, each spring including at least one elastic return element made of metal and/or made of natural or synthetic rubber or made of elastomer, and one at least of the springs being mounted between a structural support on the fuselage and a lateral support on the base of the transmission gearbox. As a variant, these elastic linkage means may include a single elastic return element, providing elastic linkages in the direction of the connecting rods and in the direction perpendicular to that of the connecting rods, and comprising at least one elastic pad fixed to a lateral support on the base of the transmission gearbox, substantially in the radial plane passing through the axis of the rotor and parallel to the connecting rods. This variant is advantageously compact and allows good integration since the single elastic return element may be offset parallel to the connecting rods, that is to say longitudinally with respect to the helicopter, forward or rearward of the main transmission gearbox, and exhibit greater longitudinal stiffness.

The adjacent ends of the levers, coupled to each other and to the connecting rods, may be directly articulated to each other, via a pivoting linkage having an axis parallel to the axes of pivoting of the levers to the fuselage, in which case it is advantageous for these adjacent ends to be stressed, at the pivoting linkage, and in the direction of the connecting rods, by at least one spring having at least one elastic return element made of metal and/or made of rubber, this spring being mounted between said adjacent ends of the levers and a structural support on the fuselage, lying substantially in the radial plane parallel to the connecting rods, in order to provide at least one elastic linkage in the direction of the connecting rods. The elastic linkage in the direction perpendicular to the connecting rods may be provided by this same spring if it consists of at least one elastic pad, but, if this is not the case, at least a second spring, having at least one elastic return element made of metal and/or made of rubber, is mounted between a structural support on the fuselage and one of the lateral supports on the transmission gearbox, to which lateral support a connecting rod is articulated, so as to provide this elastic linkage in the direction perpendicular to the connecting rods.

However, according to a particularly advantageous arrangement, the adjacent ends of the levers are articulated to a central crossbar, each end respectively via one of two articulations which are adjacent but offset with respect to each other in said radial plane parallel to the connecting rods, the crossbar being connected to the base of the transmission gearbox via at least one elastic return element providing an elastic linkage at least in the direction of the connecting rods. The linkage between the crossbar and the base of the transmission gearbox makes do with a single elastic return element which constitutes all the elastic linkage means and comprises at least one pad made of rubber providing elastic linkages in the direction of the connecting rods and in the direction perpendicular to the connecting rods.

The single elastic return element may comprise a single pad made of elastic stressed in shear between two plates, one of which is integral with the crossbar and the other with a lateral support on the base of the transmission gearbox. The advantages of this embodiment are considerable: a single elastic pad, which is not laminated and has a simple structure, provides the longitudinal and lateral elastic linkages and acts simultaneously as a stop limiting the deformations in these directions. Maintenance is facilitated since the number of components of the device is reduced and each of these components is easily dismantled. Force take-up on the structure of the fuselage is limited to the two structural supports for the articulations of the levers to the fuselage.

Advantageously, in order for the single elastic pad to work optimally in virtually pure shear, with neither tension nor compression, the pad and its plates are inclined radially from the outside inward and from the base toward the top of the transmission gearbox. Furthermore, in order to improve the lifetime of the pad, the latter advantageously includes two superimposed layers fastened to each other, providing a compressive preload in the pad. In order to provide the desired stiffnesses and to act as an effective end-of-travel stop, the pad advantageously has a cross section, in a direction substantially perpendicular to the axis of rotation, which is of oval shape having the major axis substantially perpendicular to the connecting rods. The cross section of this pad may obviously be adapted to requirements.

In order to limit the mechanical actions of the device on the fuselage and to facilitate the adaptation of different longitudinal and transverse stiffnesses, benefiting from the amplification of the longitudinal displacements (along the direction of the connecting rods) of the levers with respect to the displacements of the base of the transmission gearbox in the same direction, the connecting rods are preferably articulated to the levers between the articulations of the levers to the fuselage. Furthermore, the connecting rods are advantageously articulated to the levers and to the lateral supports of the transmission gearbox via ball joints and the levers are articulated to the central crossbar and to the corresponding structural supports on the fuselage about axes parallel to each other and perpendicular to the common plane of the connecting rods.

This architecture makes it possible, by means of small transverse displacements of the pivots of the levers on the fuselage, to modify greatly the ratio between the longitudinal and lateral stiffnesses of the suspension in order to obtain the desired stiffnesses by adapting to the stiffness of the rubber of the elastic pad, which stiffness is chosen so as to be appropriate to the desired lateral stiffness. In particular, the center-to-center distance (a), between the centers of the articulations of each lever to the corresponding connecting rod and to the crossbar, and the center-to-center distance (b), between the centers of the articulations of each lever to the corresponding connecting rod and to the corresponding structural support on the fuselage, can be chosen so that the square of the ratio (a/b) is substantially equal to the ratio of the stiffness of the suspension in the direction of the connecting rods (longitudinal stiffness) to the stiffness of the suspension in the direction perpendicular to the connecting rods (lateral stiffness).

Other characteristics and advantages of the invention will stem from the description given hereinbelow, in a nonlimiting way, of embodiments described with reference to the appended drawings, in which:

FIG. 1 is a diagrammatic view, in partial side view, of a state-of-the-art focal-point antivibration suspension device;

FIG. 2 is a diagrammatic partial view, in perspective, of an example of a device according to FIG. 1, limited to the linkage device and for a bidirectional suspension functionally equivalent to the state of the art according to U.S. Pat. No. 3,698,663;

Figure 1:
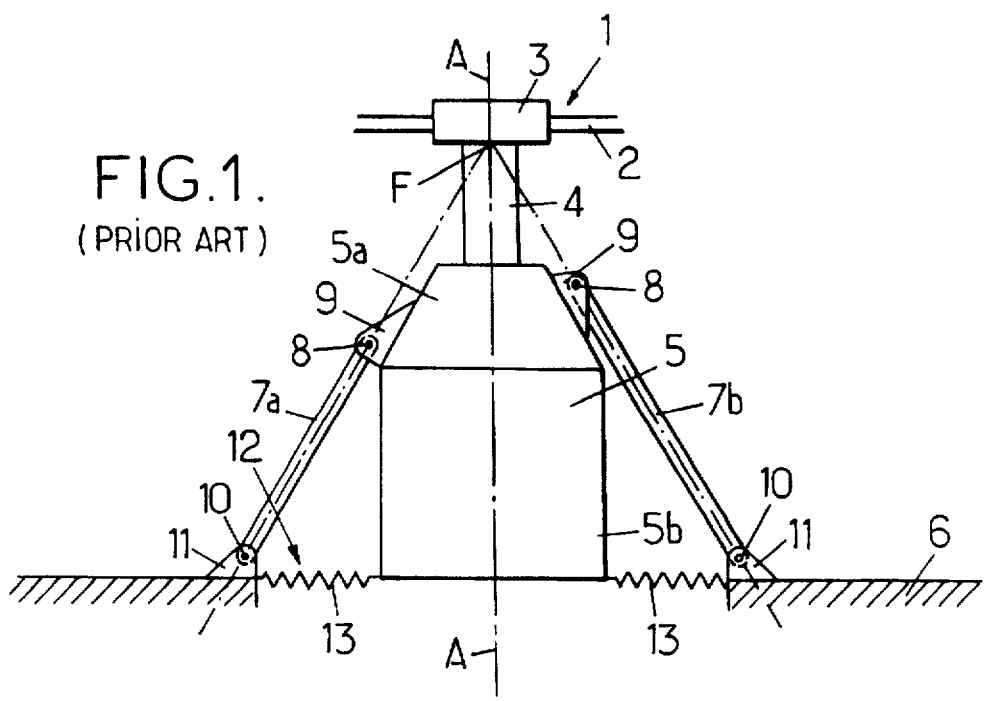

FIG. 1 represents a main helicopter rotor 1, the blades 2 of which are connected to a hub 3 rotationally integral with the upper end of a rotor mast 4 which is supported by its base in a main transmission gearbox 5 connected, in a manner not shown, by a transmission shaft to the propulsion unit of the helicopter. The transmission gearbox 5 is coaxial with the mast 4 about its axis A—A and drives it in rotation about this axis, which is the axis of rotation of the rotor. This transmission gearbox 5 is suspended on the transmission support platform 6, on the upper part of the fuselage of the helicopter, by means of a known bidirectional antivibration suspension device which comprises a set of four straight rigid suspension bars which are distributed around the gearbox 5 and are arranged obliquely with respect to the axis of rotation A—A so as to converse toward the top of the gearbox 5 and toward the axis of rotation A—A. These bars comprise two front bars 7a, arranged toward the front (on the left in FIG. 1) of the helicopter with respect to the gearbox 5, and two rear bars 7b, which are longer than the front bars 7a. These bars 7a and 7b are thus arranged substantially as the four oblique edges of a trapezoidally-based truncated pyramid which connect the large base to the small base, this small base being inclined with respect to the large base. Each bar 7a or 7b is connected to the frusto-conical upper part 5a of the casing of the gearbox 5 via its upper end, linked via a ball joint 8 to an anchoring lug 9 projecting laterally from the upper part 5a of the gearbox 5, the lugs 9 for the rear bars 7b being higher than those for the front bars 7a, and each bar 7a or 7b is connected via its lower end to the transmission support platform 6 of the fuselage via a ball joint 10 connecting it to a structural support 11 on the fuselage, for example a structural attachment fitting riveted or bolted to the transmission support platform 6.

Thus, the assembly consisting of the rotor 1, the mast 4 and the transmission gearbox 5 is attached to the structure 6 by the set of oblique bars 7a and 7b, the axes of which converge substantially on a focal point F around which the suspended assembly can oscillate.

The known focal-point bidirectional suspension device also comprises a linkage device 12 connecting the generally cylindrical base 5b of the casing of the gearbox 5 to the fuselage 6. This linkage device 12 comprises one or more longitudinal elastic linkages, shown diagrammatically at 13, allowing displacements of the base 5b of the gearbox 5 with elastic return toward the front and toward the rear of the helicopter, as well as one or more elastic linkages (not diagrammatically indicated in FIG. 1) allowing lateral displacements (perpendicular to the plane of FIG. 1) of the base 5b of the gearbox 5 with elastic return, in order to filter the respective longitudinal and transverse or lateral vibrations generated by the rotation of the rotor 1. As known from U.S. Pat. No. 3,698,663, the linkage device 12 also comprises torque transfer means consisting of a kinematic chain comprising two connecting rods 14, shown in FIG. 2, for transferring to the fuselage 6 the reaction torque in response to the rotational driving torque of the rotor 1 and of the mast 4 via the transmission gearbox 5 so as to block the rotation of the gearbox 5 about its central axis A—A due to the effect of this reaction torque.

Figure 5:
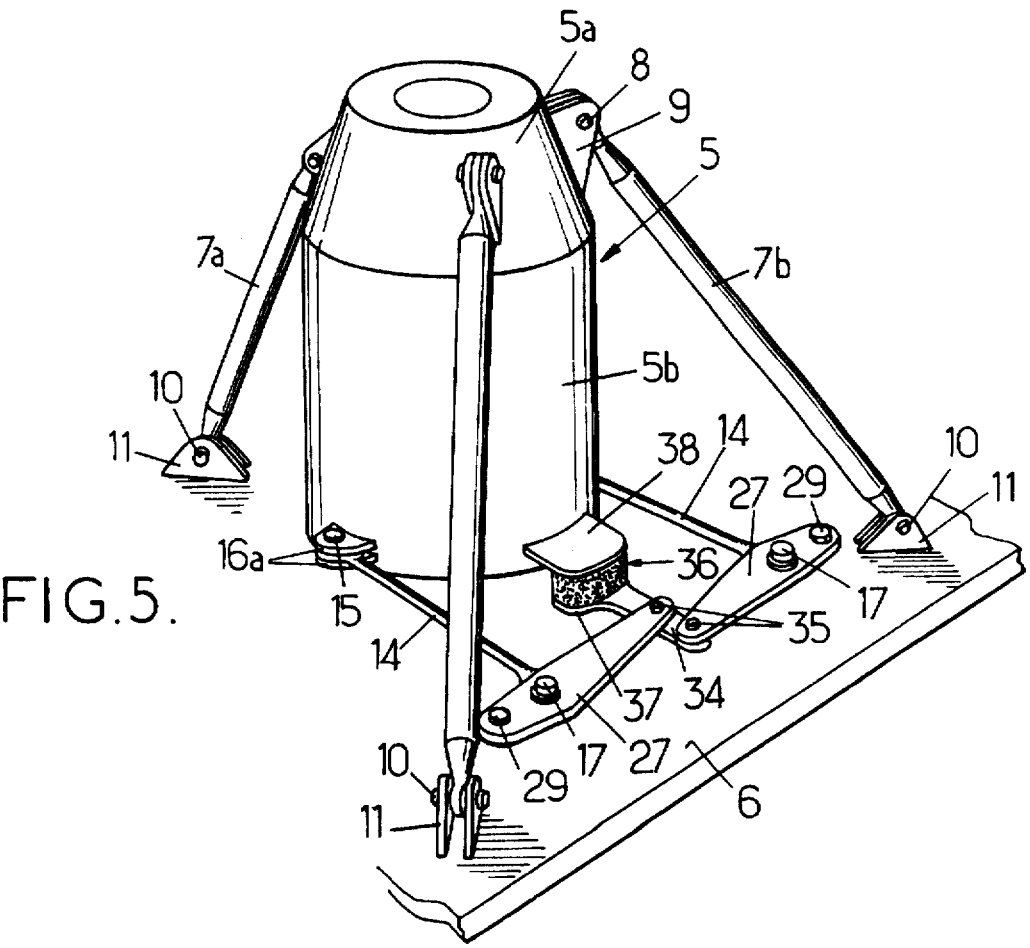
FIG. 5 is a perspective view of an embodiment of the device of FIG. 4.
Figure 2:
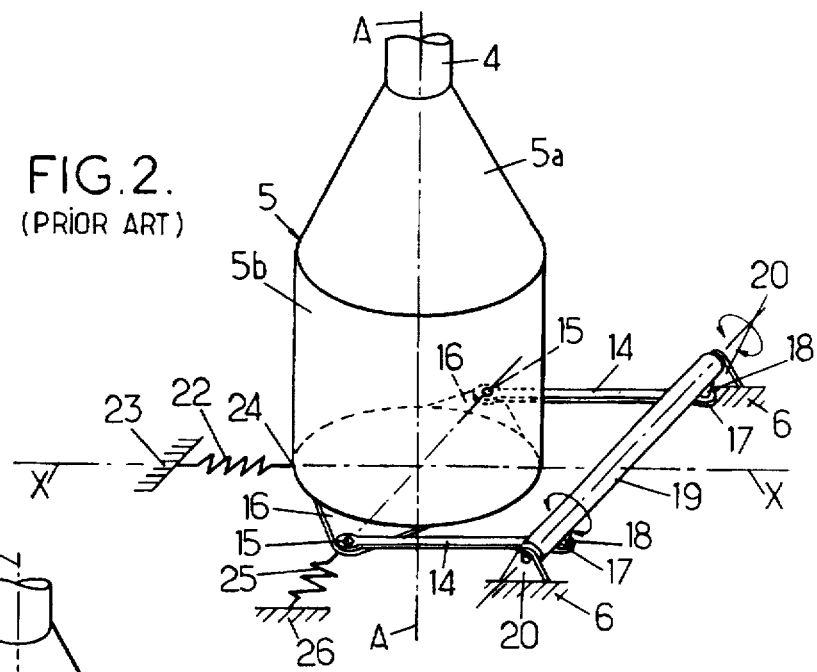
Figure 3:
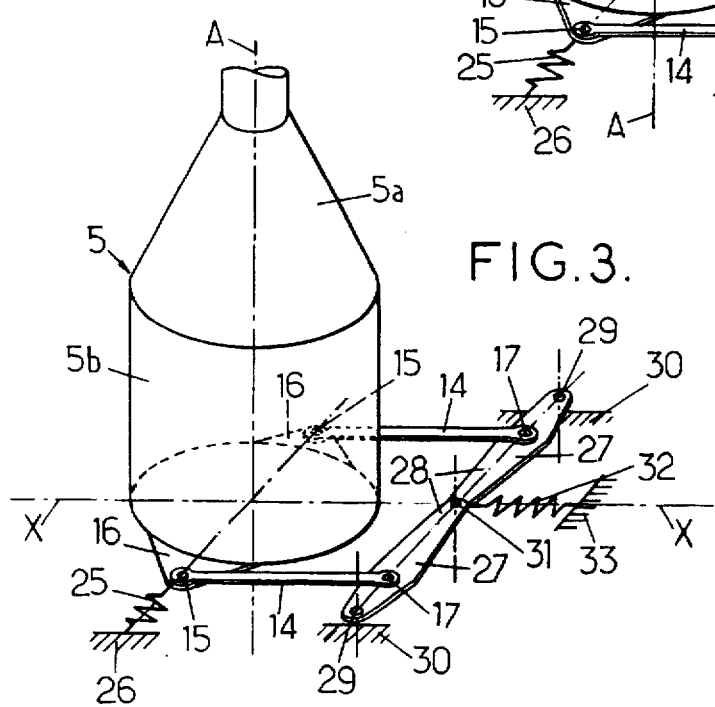
FIG. 3 is a view similar to FIG. 2 for a first example of a device according to the invention.
Figure 4:
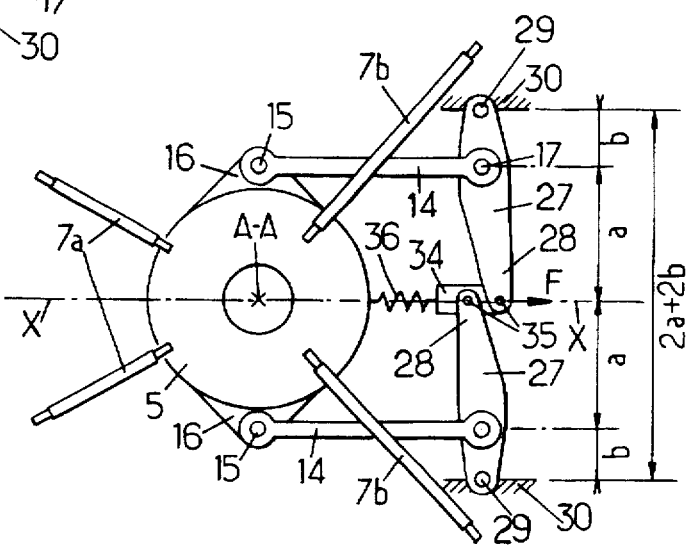
FIG. 4 is a diagrammatic plan view of a second example of a device, similar to that of FIG. 3.

In FIG. 2, as in the examples according to the invention in FIGS. 3 to 5 which include such connecting rods, the two rigid connecting rods 14, for example made of steel or of titanium, and each of the two ends of which is preferably arranged in a standard self-lubricating ball end-fitting, are identical, substantially parallel and extend in the same plane substantially perpendicular to the axis of rotation A—A, in a neutral initial position of the transmission gearbox 5. The connecting rods 14 are arranged longitudinally with respect to the helicopter, for example toward the rear of the gearbox 5 and each of them has its front end connected via a ball joint 15 to one of two diametrically opposed supports 16 projecting laterally from the base 5b of the transmission gearbox 5, it being possible for each lateral support 16, as shown in FIG. 5, to consist of a clevis having two lugs 16a which are parallel and radial, and between which the ball of the ball joint 15 of the corresponding connecting rod 14 is retained conventionally by a pin. The ball joints 15 are thus centered in the transverse radial plane passing through the central axis A—A of the gearbox 5 and perpendicular to the longitudinal axis X—X of the helicopter.

In the example in FIG. 2, and as known from U.S. Pat. No. 3,698,663, each connecting rod 14 is connected at its rear end via a ball joint 17 to the external radial end of respectively one of two parallel arms 18 projecting radially toward the outside of a torque tube 19, perpendicular to the longitudinal axis of this tube 19 and in the same diametral plane of the latter. The tube 19 is perpendicular to the connecting rods 14 and to the central axis A—A of the transmission gearbox 5. The torque tube 19 is articulated so as to rotate about its longitudinal axis via its ends each retained so as to swivel in respectively one of two structural attachment fittings 20 fixed to the transmission support platform 6, symmetrically on either side of the longitudinal axis X—X and laterally to the outside of the two ball joints 17 and of the two arms 18 which are also symmetrical on either side of the axis X—X, each ball joint 17 being near the fitting 20 on the corresponding side.

The two identical connecting rods 14 are thus mounted in an identical manner, but symmetrically with respect to the longitudinal axis X—X, on the transmission gearbox 5 and on the torque tube 19 articulated to the structure on the fuselage. Thus, the reaction torque which stresses the transmission gearbox 5 in rotation about its axis A—A is transmitted via the connecting rods 14, one of which works in compression and the other in tension, to the torque tube 19, the end parts of which are stressed in torsion about its longitudinal axis in opposite directions but with torque moments of the same magnitude, via the two connecting rods 14, the articulations 17 of which are each in the vicinity of the articulation of the tube 19 to the corresponding structural attachment fitting 20. In a known manner, the torque tube 19 opposes an elastic return to the torsional deformations in opposite directions, which it is subjected to by the connecting rods 14, and tends to return toward its initial rest position, corresponding to the absence of torque load on the connecting rods 14, and to the transmission gearbox 5 in the initial neutral position. If the arms 18 are short, it is understood that the kinematic chain consisting of the tube 19, the arms 18, the connecting rods 14 and the articulations 15 and 17 exhibits a very high torque rigidity, even with a small-sized torque tube 19.

The longitudinal excitations (along the axis X—X) of the transmission gearbox 5 correspond to simultaneous tensile or compressive stresses of the connecting rods 14 causing the tube 19 to rotate about itself in one direction or the other. In FIG. 2, these longitudinal excitations are filtered by a single spring 22 which may be metallic or may include at least one elastically deformable element made of natural or synthetic rubber (elastomer) and which is articulated, on the one hand, to a structural support 23 fixed to the fuselage 6 and, on the other hand, to a support 24 projecting laterally from the base 5b of the transmission gearbox 5, the two linkages to the supports 23 and 24 being centered in the radial plane passing through the axis A—A and through the axis X—X, and therefore parallel to the connecting rods 14, so that the spring 22 extends along the axis X—X and constitutes a longitudinal elastic linkage. This spring 22 corresponds functionally to the two elements made of elastomer which are mounted between structural supports on the fuselage and two connecting rods articulated to arms projecting radially from the torque tube 19, on the opposite side and in the extension of the arms 18, as described in U.S. Pat. No. 3,698,663 in order to provide the longitudinal return (by being superimposed on the elastic return of the torque tube itself).

In FIG. 2, a second spring 25, having a structure similar to the spring 22, constitutes a transverse or lateral elastic linkage and is also articulated, on the one hand, to a structural support 26 fixed to the structure of the fuselage 6 and, on the other hand, to the gearbox 5 and, conveniently, to one of the supports 16 to which the connecting rods 14 are articulated, in order to filter the lateral excitations of the gearbox 5 which are allowed by the connecting rods 14 and the torque tube 19. This spring 25 corresponds functionally to the two elements made of elastomer which are mounted between structural supports on the fuselage and two connecting rods articulated to the base of the gearbox 5 and which extend substantially perpendicular to the main connecting rods 14, as described in U.S. Pat. No. 3,698,663 for providing the lateral return.

According to the invention, in the example of FIG. 3, the rear end of each connecting rod 14 is no longer articulated to a common transverse torque tube but is connected via the standard self-lubricating ball joint 17 on respectively one of two rigid transverse levers 27 which are articulated to the transmission support platform 6. The levers 27, made of steel, are arranged substantially so that each is in the extension of the other, in abutting configuration in the region of ends 28 by which they are adjacent, and are oriented so as to be perpendicular to the connecting rods 14. At its end opposite the end 28, each of the levers 27 is articulated by a pivoting connection 29 so as to pivot about a pivot axis perpendicular to the plane of the connecting rods 14, and therefore substantially parallel to the axis A—A, on a structural attachment fitting 30 fixed to the transmission support platform 6. Each articulation 17 of a connecting rod 14 to the corresponding lever 27 is in the vicinity of the articulation 29 of this lever to the fuselage, and the two articulations 17 are located between the two articulations 29. At their adjacent ends 28, the two levers 27 are articulated to each other by a pivoting linkage 31 having a pivot axis parallel to the pivot axes of the articulations 29. The pivoting linkage 31 is centered on the longitudinal axis X—X and its pivot axis contained in the radial plane passing through the axes A—A and X—X, and therefore parallel to the connecting rods 14. In the region of this pivoting linkage 31, the adjacent ends 28 of the levers 27 are stressed along the axis X—X by a spring 32, constituting a longitudinal elastic linkage, and made of metal or comprising one or more elastically deformable elements made of natural rubber or made of elastomer. This spring 32 is mounted between the pivoting linkage 31 and a structural support 33 on the fuselage, to which the spring 32 is articulated by a ball joint centered on the axis X—X.

As in the example in FIG. 2, the transverse elastic linkage is provided by a spring 25 articulated by ball joints between the structural support 26 on the fuselage and one of the lateral supports 16 on the transmission gearbox 5. In addition, but in a manner not shown, the spring 25, the direction of action of which is perpendicular to that of the spring 32, and extending in the radial plane perpendicular to the axis X—X, is, like the spring 32, advantageously provided with at least one stop limiting the relative displacements of the transmission gearbox 5 and of the fuselage 6.

In this arrangement, the two parallel connecting rods 14 for taking up the reaction torque stressing the casing of the transmission gearbox 5 are synchronized by the two coupled rocker levers 27, these being articulated to the fuselage and returned toward the neutral initial position by the spring 32, during longitudinal oscillations of the transmission gearbox 5, the transverse oscillations of which are filtered by the spring 25.

The advantage of this embodiment is that the rocker levers 27 may be arranged at a low height above the transmission support platform 6 and that they exhibit very high stiffness under torque, always remaining easily accessible, as are the articulations 17 and 29, and the return members 32 and 25, none of which have to be installed beneath the transmission support platform.

In a particularly advantageous variant of the device in FIG. 3, which is shown in FIG. 5, and a diagrammatic plan view of which is given by FIG. 4, the adjacent ends 28 of the levers 27 are no longer articulated to each other but each of them is articulated to a central crossbar 34 oriented along the axis X—X, via respectively one of two neighboring pivot articulations 35 which are offset with respect to each other along the axis X—X and the pivot axes of which are parallel to each other and to the pivot axes of the articulations 29 of the levers 27 to the fuselage. The pivot articulations 29 and 35 are preferably equipped, in a known manner, with self-lubricating rings and the structural fittings 30 for attachment of the articulations 29 to the fuselage are, for example, riveted flat to the transmission support platform 6, each close to the structural fitting 11 for taking up the rear bar 7b on the corresponding side.

The crossbar 34 is connected to the base 5b of the transmission gearbox 5 via a single elastic return element 36, shown diagrammatically as a spring in FIG. 4, but consisting, as shown in FIG. 5, of a single elastic pad made of nonlaminated elastomer, constituting all of the elastic linkage means linking the base of the transmission gearbox 5 to the fuselage and therefore providing the elastic linkages in the longitudinal direction, parallel to the connecting rods 14, and in the lateral direction, perpendicular to the connecting rods 14, as well as the functions of longitudinal and transverse deformation end-of-travel stops limiting the relative displacements of the gearbox 5 and of the fuselage.

Thus, the levers 27 articulated to the fuselage are connected to the base of the transmission gearbox 5 via the elastic pad 36 which, as shown in FIG. 5, is mounted and stressed in shear between two rigid plates, a lower plate 37 of which constituting an enlarged extension of the crossbar 34 and an upper plate 38 integral with a lateral support projecting from the rear of the base of the transmission gearbox 5, so that the pad 36 and its plates 37 and 38 are centered on the axis X—X.

The cross section of the rubber pad 36, parallel to its plane end faces adhesively bonded to the plates 37 and 38, has a substantially oval shape, the major axis of which is perpendicular to the connecting rods 14. In addition, this pad 36 includes two superimposed layers, which have been fastened to each other under a compressive load, so as to introduce into the pad 36 a compressive preload beneficial to its lifetime and making it possible to prevent it cracking.

Figure 6:
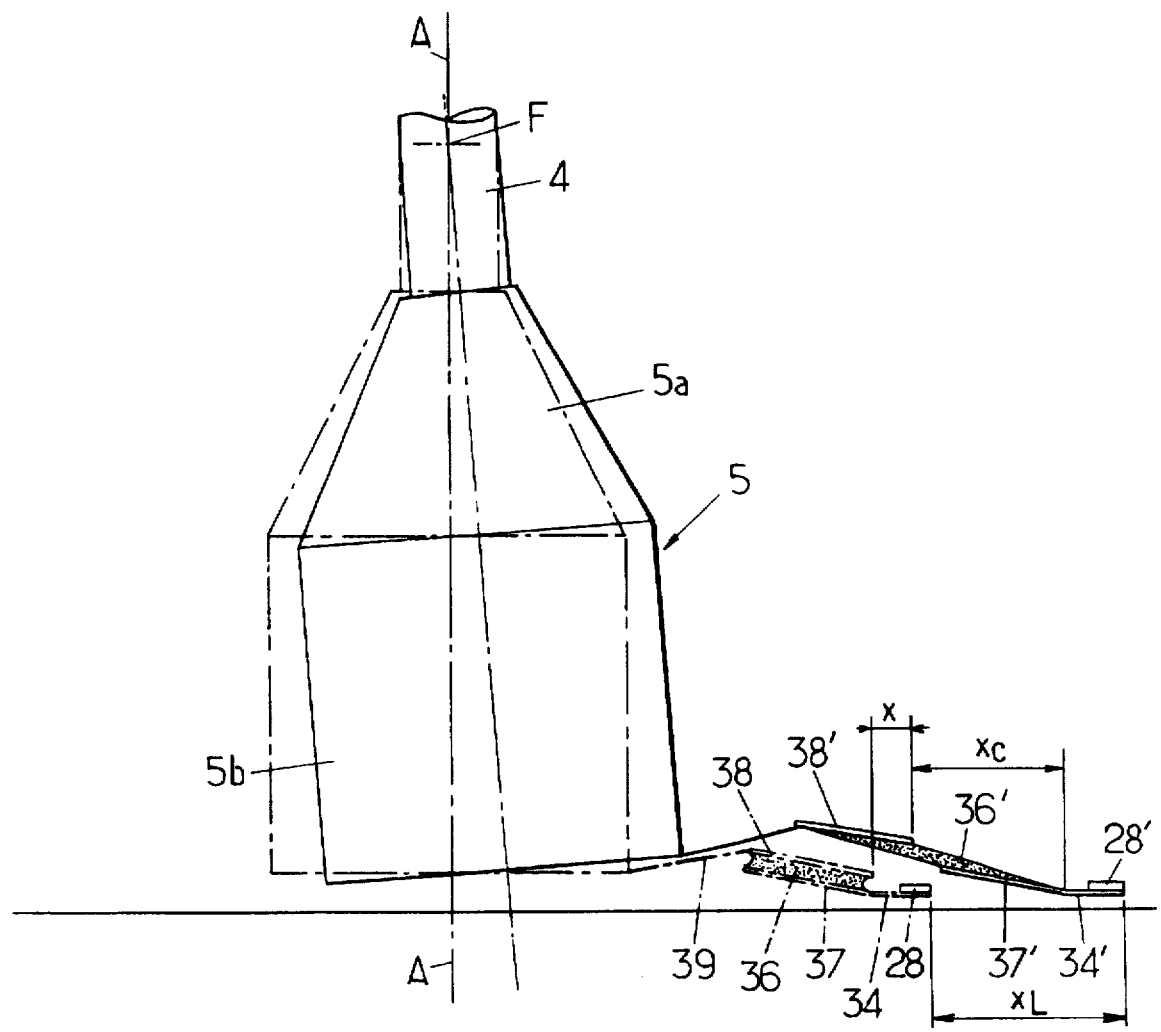
FIG. 6 is a diagrammatic partial view, in side elevation and partly in axial cross section, of the device of FIG. 5, represented in two different positions in order to show the deformations of the elastic pad.

In order for the elastic pad 36 to work optimally in virtually pure shear, without either tension or compression, it is slightly inclined, along the minor axis of its oval section, together with its plates 37 and 38, radially from the outside inward and axially from the bottom toward the top of the transmission gearbox 5, as shown in FIG. 6, on which the neutral initial position of the gearbox 5 is shown by dot-dash lines and the lateral support of the gearbox 5 which is integral with the upper plate 38 of the pad 36 is referenced at 39. Given the position of the pad 36 and the kinematics of the device, the optimum angle of inclination is of the order of 7°, but a few degrees of deviation would only cause a negligible transverse line of deformation in the rubber of the pad 36 due to the effect of a tension-compression parasitic load. This inclination corresponds to the relative movements of the transmission gearbox 5 and of the levers 27, taking into account the amplification of the longitudinal excursions of the adjacent ends 28 of the levers 27 with respect to the longitudinal excursions of the base 5b of the transmission gearbox 5. FIG. 6 shows, in solid lines, the position of the gearbox 5 during a rearward longitudinal displacement of amplitude "x" from the initial neutral position, shown as dot-dash lines, by pivoting about the focal point F, this amplitude "x" being referenced at the free rear end of the plate 38, between its initial position and its corresponding pivoted position at 38'. Simultaneously, the longitudinal displacement "x", transmitted by the connecting rods 14 to the articulations 17 of the levers 27, causes, because of the position of the articulations 29 of the levers 27 to the fuselage, an amplified longitudinal displacement "$x_L$", in the same direction, of the adjacent ends 28 of the levers 27 and of the crossbar 34, which end up occupying positions referenced at 28' and 34'. The pad 36 is deformed in longitudinal shear, as shown at 36', between its plates occupying the positions 38' and 37', with a deformation amplitude "$x_c$" which is intermediate between "x" and "$X_L$".

The pad 36 is defined by its oval shape and the natural or synthetic rubber of which it is composed, in order to provide the necessary compliance of the lateral suspension for the optimum filtering of the vibrations in this direction. The desired longitudinal stiffness (greater than the lateral stiffness) is then obtained by choosing the relative positions of the articulations 17 and 29 of the levers 27 to the connecting rods 14 and to the fuselage. In fact, if $\lambda$ is the ratio between the longitudinal stiffness and the lateral stiffness, if a is the center-to-center distance between the centers of the articulations 35 and 17 and b the center-to-center distance between the centers of the articulations 17 and 29, for each lever 27, as indicated in FIG. 4, then, for a longitudinal displacement x of the gearbox 5, the longitudinal shear of the pad 36 is $X_c = x \cdot (a/b)$ and thus $\lambda = (a/b)^2$.

Starting from a center-to-center distance 2a between the articulations 17, which is fixed by the construction of the base of the transmission gearbox 5 and of its lateral supports 16, and from a pad 36 which, by construction, gives the desired lateral stiffness, if a given longitudinal stiffness is desired, with a given ratio $\lambda$ with respect to the lateral stiffness, all that is required is to choose the center-to-center distance b so that $\lambda = (a/b)^2$, which positions the articulations 29 to the fuselage with their center-to-center distance 2(a+b).

It is worthwhile pointing out that a very different ratio $\lambda$ may easily be obtained by varying the center-to-center distance b by a relatively small amount. No particular problem is posed in obtaining the longitudinal stiffness from the transverse stiffness since the calculation of a lever ratio is quite reliable and accurate. The accuracy depends directly on that obtained on the lateral stiffness, in the definition of the rubber of the pad 36.

A bidirectional antivibration suspension device is thus obtained which has a low mass, exhibits excellent reliability and is easy to maintain by virtue especially of the single elastic pad 36. This device is particularly suited when the geometry and the dynamic operation of the suspended assembly require very different stiffnesses in the longitudinal and transverse directions. This device is suitable for an installation in which the space, which may possibly have a very low height, between the bottom of the transmission gearbox 5 and the transmission support platform 6, must be clear. This very compact device, each of whose constituent elements is easily interchangeable, may be mounted on a transmission support platform 6 without major modification of the latter or of the casing of the transmission gearbox 5, the linkages of the suspension device, on the one hand, to the transmission gearbox 5 and, on the other hand, to the transmission support platform 6 on the fuselage being limited to two points of attachment in the example in FIGS. 4 to 6.

I claim:

1. A suspension device providing a bidirectional antivibration suspension of a helicopter rotor on a fuselage of a helicopter wherein the rotor is rotationally integral with a mast supported and rotationally driven about an axis of rotation by a coaxial transmission gearbox, the suspension device comprising:
   a set of at least three straight rigid suspension bars, said suspension bars being distributed around the transmission gearbox and arranged obliquely so as to converge toward the axis of rotation, each said bar being connected via a first end thereof to the transmission gearbox and articulated via a second end thereof to a structural support on the fuselage; and
   a linking device which links a base of the transmission gearbox to the fuselage, said linking device including:
   (a) a torque transfer means for allowing transfer to is the fuselage of a reaction torque in reaction to a driving torque of the rotor via the transmission gearbox, said torque transfer means including
     (i) two identical connecting rods, said connecting rods being substantially parallel and extending substantially in a same plane perpendicular to the axis of rotation,
       a first end of each respective said connecting rod being articulated by an articulation to a respective one of two lateral supports which said lateral supports are respectively fixed to opposite sides of the transmission gearbox, said connecting rods extending on a same side of a plane substantially parallel to the axis of rotation and passing through the articulations of the connecting rods with said lateral supports,
       a second end of each respective said connecting rod,
     (ii) two levers,
       each said lever lying substantially in an extension of the other and perpendicular to said connecting rods,
       each said lever being articulated by an articulation to pivot on a support on the fuselage about an axis substantially parallel to the axis of rotation,
       each said lever being connected to one another via adjacent ends in a radial plane passing through the axis of rotation and parallel to said connecting rods, and
       each said lever being respectively articulated by a respective articulation to a respective said second end of said connecting rods, and
   (b) an elastic linkage means for allowing displacements of the base of the transmission gearbox with respect to the fuselage with compliance in two directions perpendicular to each other and to the axis of rotation in order to filter vibrations between the rotor and the fuselage, said linkage means including
     an elastic return element attached to said adjacent ends of said levers which stresses said adjacent ends in a direction parallel to said connecting rods.

2. Suspension device according to 1, wherein said elastic return element is a first spring, and wherein the elastic linkage means further comprises a second spring which provides an elastic linkage in the direction perpendicular to that of the connecting rods, one at least of the first and second springs being mounted between a structural support on the fuselage and a lateral support on the base of the transmission gearbox.

3. Suspension device according to claim 1, wherein the elastic linkage means includes only a single said elastic return element which provides elastic linkages in the direction of the connecting rods and in the direction perpendicular to that of the connecting rods, and said elastic return element comprising at least one elastic pad fixed to a lateral support on the base of the transmission gearbox and said elastic pad being substantially in a radial plane passing through the axis of the rotation and parallel to the connecting rods.

4. Suspension device according to claim 1, wherein the adjacent ends of the levers are directly articulated to each other via a pivoting linkage having an axis parallel to the axes of pivoting of the levers to the fuselage, and said elastic return element includes a spring which is mounted between said adjacent ends of the levers and a structural support on the fuselage and which is lying substantially in the radial plane parallel to the connecting rods.

5. Suspension device according to claim 4, wherein said elastic linkage means includes a second spring which is mounted between a structural support on the fuselage and one of the lateral supports on the transmission gearbox, to which lateral supports the connecting rods are articulated so as to provide an elastic linkage in the direction perpendicular to the connecting rods.

6. Suspension device according to claim 1, wherein the adjacent ends of the levers are articulated to a central crossbar, each adjacent end being respectively articulated via a respective crossbar articulation which said crossbar articulations are adjacent but offset with respect to each other in said radial plane parallel to the connecting rods, the crossbar being connected to the base of the transmission gearbox via said elastic return element providing an elastic linkage at least in the direction of the connecting rods.

7. Suspension device according to claim 6, wherein the crossbar is connected to the base of the transmission gearbox via a single said elastic return element, and wherein said elastic linkage means comprises only said single elastic return element which includes at least one pad made of elastic providing elastic linkages in the direction of the connecting rods and in the direction perpendicular to the connecting rods.

8. Suspension device according to claim 7, wherein said elastic return element comprises a single elastic pad stressed in shear between two plates, one plate being integral with the crossbar and the other plate being integral with a lateral support on the base of the transmission gearbox.

9. Suspension device according to claim 8, wherein the elastic pad has a cross section substantially perpendicular to the axis of rotation which is of oval shape having a major axis substantially perpendicular to the connecting rods.

10. Suspension device according to claim 8, wherein the elastic pad includes two superimposed layers fastened to each other providing a compressive preload in the pad.

11. Suspension device according to claim 8, wherein the pad and said plates are radially inclined from an outside inward and from the base toward a top of the transmission gearbox.

12. Suspension device according to claim 1, wherein the articulations of the connecting rods to the levers are located between the articulations of the levers to the fuselage.

13. Suspension device according to claim 6, wherein said articulations of the connecting rods to the levers and to the lateral supports of the transmission gearbox are ball joints, and wherein the levers are articulated to the central crossbar and to the corresponding structural supports on the fuselage about axes parallel to each other and perpendicular to a common plane of the connecting rods.

14. Suspension device according to claim 13, wherein a first center-to-center distance between centers of the articulations of each lever to the corresponding connecting rod and to the crossbar, and a second center-to-center distance between the centers of the articulations of each lever to the corresponding connecting rod and to the corresponding structural connecting rod and to the corresponding structural support on the fuselage, are chosen so that a square of a ratio of the first distance over the second distance is substantially equal to a ratio of a stiffness of a suspension in the direction of the connecting rods to a stiffness of the suspension in the direction perpendicular to the connecting rods.

* * * * *